United States Patent

[11] 3,634,168

[72] Inventors Casper Johannes Gerardus Ferdinand Janssen; Hendrik Jonker; Theodorus Petrus Gerardus Wilhelm Thijssens, all of Emmasingel, Eindhoven, Netherlands

[21] Appl. No. 25,369
[22] Filed Apr. 3, 1970
[45] Patented Jan. 11, 1972
[73] Assignee U.S. Philips Corporation New York, N.Y.
[32] Priority Apr. 10, 1969
[33] Netherlands
[31] 6905500

---

[54] METHOD OF PROVIDING A PRINTED CIRCUIT ON A COHERENT MEMORY PLATE HAVING STORE AND SWITCHING ELEMENTS
3 Claims, 9 Drawing Figs.

[52] U.S. Cl. .................................................... 156/272, 156/150, 96/36.2, 117/212

[51] Int. Cl. .................................................... H05k 13/00
[50] Field of Search .................................................... 156/150, 153, 272; 117/212; 96/36.2

[56] References Cited

FOREIGN PATENTS 1,123,537 8/1968 Great Britain ................
985,244 8/1962 Great Britain ................

*Primary Examiner*—Carl D. Quarforth
*Assistant Examiner*—R. E. Schafer
*Attorney*—Frank R. Trifari

---

ABSTRACT: A method of applying a printed circuit to a coherent memory plate by coating the plate with photoresist, hardening the photoresist, applying adhesive, which may be hardened at less than 130° C., to the photoresist and providing a printed metallic circuit on the hardened adhesive.

INVENTORS
CASPER J.G.F. JANSSEN
HENDRIK JONKER
THEODORUS P.G.W. THIJSSENS
BY AUGUSTINUS J. GERRITS
Agent INVENTORS
CASPER J.G.F. JANSSEN
HENDRIK JONKER
THEODORUS P.G.W. THIJSSENS
AUGUSTINUS J. GERRITS
BY
Agent INVENTORS
CASPER J.G.F. JANSSEN
HENDRIK JONKER
THEODORUS P.G.W. THIJSSENS
AUGUSTINUS J. GERRITS
BY Frank R. Jandiani
Agent

METHOD OF PROVIDING A PRINTED CIRCUIT ON A COHERENT MEMORY PLATE HAVING STORE AND SWITCHING ELEMENTS

The invention relates to a method of providing a printed circuit on a coherent memory plate having store and switching elements which are formed from a sheet of metallic magnetic material having a right-angled hysteresis loop such as permalloy.

Such a product formS part of a three-dimensional word-organized magnetic store which is described in British Pat. No. 1,123,537 and which comprises a plurality of stacked printed circuit plates having store and switching elements formed on each plate, the store elements belonging to the same word being coupled through a common word conductor to a common magnetic switching element and being provided on the same plate together with the store and switching elements of a plurality of other words, the switching elements of the various words being arranged after stacking of the plates in a matrix in rows and columns which switching elements are rod-shaped in the form of open magnetic circuits and are arranged along at least one edge of the plates and in the plane thereof, the switching elements of the same column being coupled to the same column conductor while the elements of the same row are coupled to the same row conductor, the word conductors and the row conductors being formed by printed circuits provided on the plates and the switching elements and the column conductors being formed as coils slipped onto the common rod-shaped switching elements of the same column.

In the accompanying drawings

Figure 1:
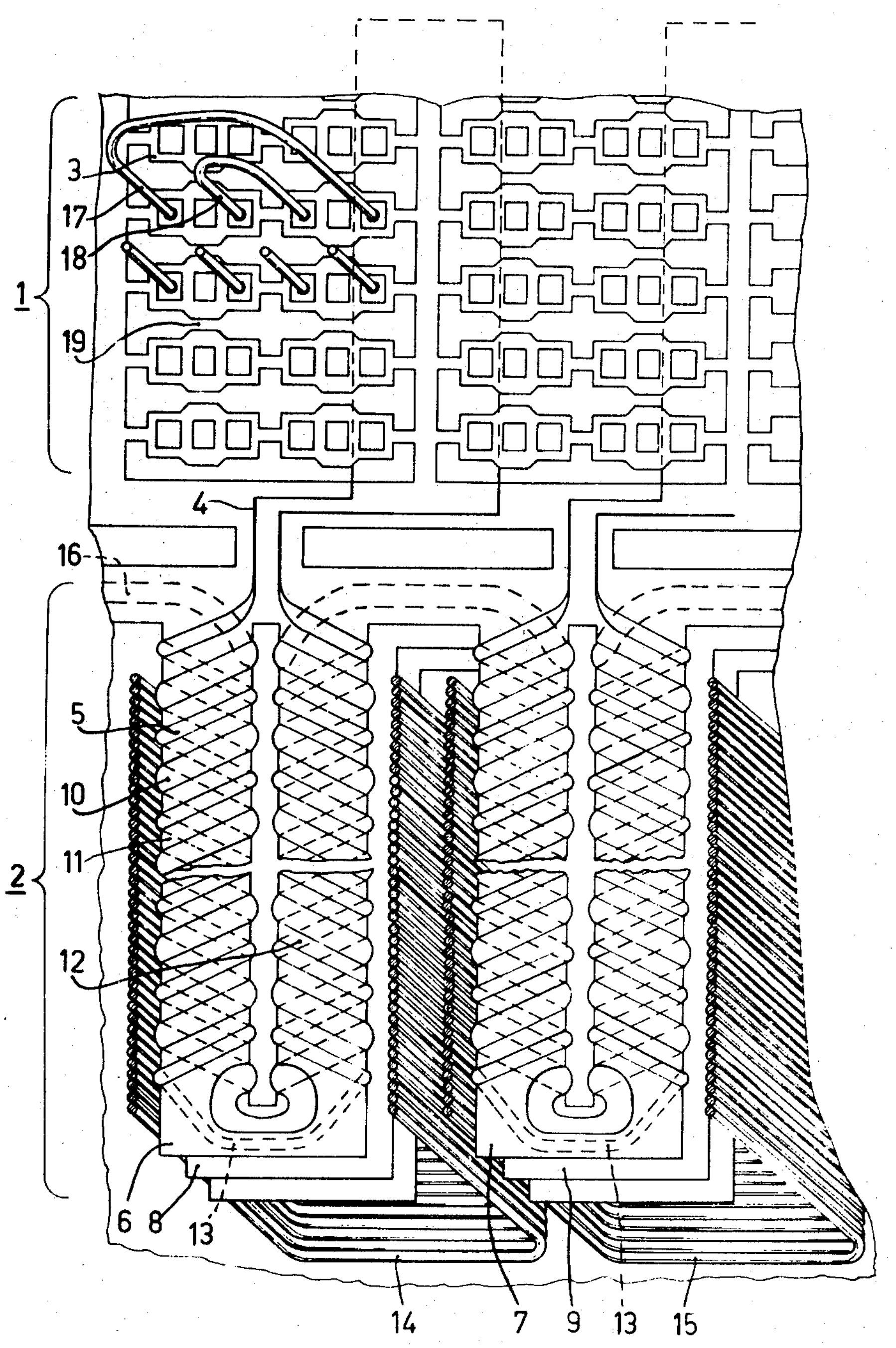
FIG. 1 shows part of such a memory plate.

In FIG. 1 the reference numeral 1 denotes part of the store matrix comprising an array of three-hole elements and the reference numeral 2 denotes a row of switching elements. The assembly is coherently formed from platelike metallic magnetic material 3 having a right-angled hysteresis loop such as nickel-iron or permalloy. The word conductors 4 are formed on the plates as printed circuits which are coupled to the switching elements through coupling windings 5 printed thereon and which extend through the apertures of the store elements. To make possible a simple wiring the store elements of each word are arranged in two parallel rows and the coupling conductors are threaded alternately up and down through the apertures so as to form a closed loop.

The switching elements 6, 7 and 8, 9 of the same plate are coupled to the same horizontal conductor 16. These conductors are also formed on the plates as printed circuits which constitute a coupling winding on the rod-shaped projections 6, 7.

It is fundamentally possible for the two coupling windings to be formed on the switching elements one over the other with the interposition of an insulating layer. However, this requires a plurality of operations in the manufacture. The windings 5 and 10 for the word conductor and the row conductor can be formed on the switching elements while avoiding crossings. To this end the projections are split into two parallel limbs 11 and 12 the free ends of which are coupled together by a coupling part 13. The winding 10 extends helically on the two limbs 11 and 12 but with opposite winding sense. The ends of the two partial windings are coupled together through the coupling part 13. The winding 5 is similar to winding 10 and extends between the adjacent turns of the latter. When a current is supplied to the winding 10 of the row conductor the magnetic field in the two limbs will thus have the same direction.

In the manufacture of a store the printed circuits are first formed on the plates and then the plates are stacked on one another in such a manner that corresponding store elements as well as the rod-shaped switching elements come to lie above one another in columns.

Subsequently the switching elements of each column are provided with a common control winding 14, 15 etc.

This may be effected here in a simple manner by slipping prefabricated coils onto the switching elements.

Furthermore vertical control conductors, for example, 17 and 18 are threaded through the various apertures located above one another in the three-hole elements.

Great difficulties were encountered during the experiments which had for their object to render the method of providing printed circuits on such memory plates employing an integrated magnetic selection system suitable for bulk manufacture.

It is known from the "Proceedings of the Institute of Radio Engineers," 1957, pages 325–334 to provide a printed circuit on a ferrite apertured memory plate wherein the selection portion does not form an integrating constituent of the plate. Since the ferrite material suitable for this purpose is not electrically conductive, there are no particular difficulties. Such ferrite matrices are, however, very vulnerable.

A method of manufacturing a nonintegrated store matrix wherein toroids comprising permalloy are provided with a printed circuit is also known from the "Proceedings of the Fall Joint Computer Conference," 27, part 1, pages 1035–1043 (1965). These toroids are obtained from a permalloy foil by means of a photoetching method. This method is, however, very complicated not only because of the number of operations but also because of the fact that the combination of wet chemical operations and vapor deposition of metal in a vacuum is used.

The individual elements of a permalloy store matrix must be free from nonuniform mechanical tensions which cause variations in the magnetic properties. In coherent permalloy memory plate employing integrated switching elements such tensions are of course more serious than in a memory plate wherein the store elements are not coherent and are not integrated with the switching elements such as in the known matrix described above. Yet these tensions may also occur in the last-mentioned memory plates as is apparent from the method described in British Pat. No. 985,244 wherein a layer comprising silicon rubber, optionally in combination with a layer of silicon grease, is intended to take up the tensions. These layers are then provided with a thermoplastic layer upon which a thin metal film is deposited by means of vacuum vapor deposition techniques which metal film is provided with the printed circuit. The adhesion of this thermoplastic layer supporting the printed circuit onto the layer or layers of the silicon compounds is, however, unreliable certainly in the case of a permalloy matrix wherein store elements and rod-shaped switching elements are integrated.

The following problems occurred during the experiments which led to the invented method of providing a printed circuit on a memory plate of the kind defined above wherein the store elements and the rod-shaped switching elements are formed in a sheet of the metallic magnetic material by means of photoetching. The wiring must be electrically insulated from the plate. The insulation must be free from holes, it must have a good adhesion with the magnetic material and with the metal which constitutes the wiring and finally it must not cause harmful mechanical tensions in combination with the wiring within the trajectory of operating temperatures of the finished store.

During the experiments which led to the present invention the attempts to find a single insulation layer satisfying all mentioned conditions failed. The magnetic behavior of the magnetic material was disturbed in an inadmissible manner when the layer had to be hardened at a temperature of more than 130° C. Insulation layers which could be hardened at a lower temperature showed many small holes either after they had been provided, which holes caused short circuits, or a too weak adhesion to the wiring provided thereon.

The method according to the present invention is characterized in that the platelike matrix of store and switching elements comprising metallic magnetic material having a right-angled hysteresis loop is completely embedded in a layer of a photoresist which can be hardened by exposure to light which hardened resist is adhered to the metal of the printed circuit by means of an adhesive layer which can be hardened at a temperature of less than 130° C. and the solvent of which does not or does not substantially attack the hardened photoresist.

The photoresist which is preferably provided in a thickness of approximately 10–40 μm. comprises, for example a polyvinyl cinnamate such as is marketed by Eastman Kodak under the names of KPR and KOR, or it is based on the photosensitivity of an organic azide such as the photoresist which is commercially available under the name of KTFR (Eastman Kodak, or it comprises a mixture of polyvinyl butyral and a bichromate.

To adhesive which is preferably used in a thickness of 5–20 μm. is, for example, a synthetic rubberlike adhesive obtained by dissolving 2 parts by weight of a butadiene acrylonitrile copolymer in a 2:1 molar ratio of butadiene and acrylonitrile and 1 part by weight of a cresol formaldehyde resin in a 1:1.4 molar ratio of cresol of formaldehyde dissolved in methylethyl ketone or an adhesive prepared by dissolving a polyester of terephthalic acid and propylene glycol in 1,1,2-trichloroethane. A hardening temperature of between 70° and 90° C. may suffice for both types.

Figure 2:
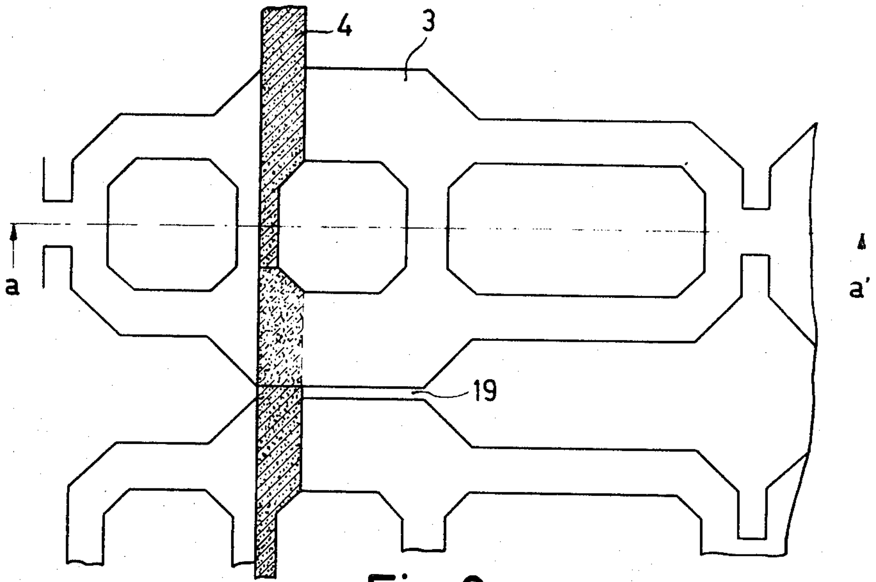
FIG. 2 shows in detail the manner in which the word conductor extends through the three-hole elements and FIGS. 3 to 9 show in a diagrammatical cross section taken on the line *a–a'* of FIG. 2 successive stages of a method according to the invention.

When providing both the photoresist and the adhesive by means of immersion there is the risk that the fairly small holes in the matrix are completely filled up by the resist or the adhesive. Therefore it is advantageous to provide both resist and adhesive by means of spraying. When the channels 19 in FIGS. 1 and 2 are not chosen to be broader than approximately 50 μm. while the smallest dimensions of the apertures in the three-hole elements are at least four times greater, the channel 19 may easily be bridged by the packet of layers so that the word conductor can extend straightly while the three-hole elements remain open.

The combination of the two layers according to the invention is found to be able to take up possible tensions exerted by the printed pattern to a sufficient extent. When using metallizing baths it is otherwise recommendable to choose those baths which are known to produce metal deposits having a low internal tension.

In order to enhance the adhesion of the printed pattern to the adhesive layer it is recommended to give it a preliminary mild chemical roughening treatment, for example, with nitric acid.

The printed pattern may be provided on the adhesive layer in different manners. After the roughened layer has been uniformly provided in known manner with nuclei, for example, by successive immersion, in a solution of $SnCl_2$, in hydrochloric acid and in a diluted solution of $PdCl_2$, a copper layer of several tenths to a few microns thick is deposited thereon by means of chemical reduction from a solution. The pattern is electrodeposited to the desired thickness with the aid of an electroresist whereafter the resist and the thin copper layer are removed.

It is alternatively possible to intensity the thin copper layer uniformly by means of electrodeposition and subsequently to etch out the pattern with the aid of an etching resist.

The pattern may be provided photochemically in the form of physically developable metal nuclei on the roughened adhesive layer and these nuclei may be intensified by means of physical development succeeded by electroless metallizing and/or electrodeposition to the desired thickness. It is alternatively possible to use an adhesive layer which is pigmented with a semiconducting photosensitive metal oxide such as $TiO_2$ and to provide the pattern directly thereon likewise by photochemical process.

The invention will now further be described with reference to the accompanying diagrammatic drawings and a few examples.

EXAMPLE 1

Figure 3:
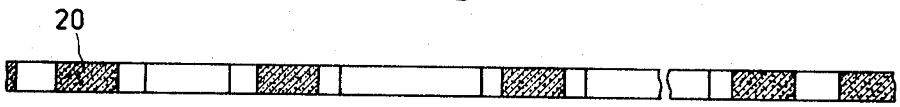
Figure 4:
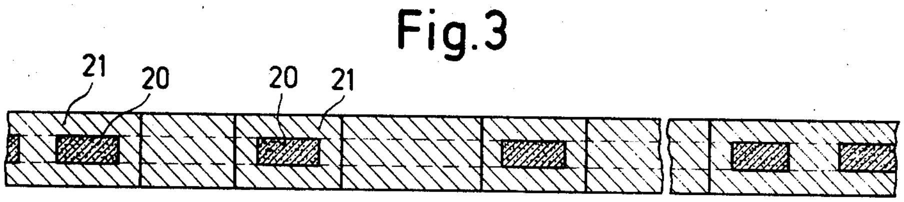

An insulating layer 21 (FIG. 4) was provided by means of spraying a diluted solution of a negative photoresist lacquer consisting of a xylene solution of 27.5 percent by weight of a cyclicized polyisoprene with an average molecular length of 990 A., and a degree of unsaturation of 39 percent (iodine number 143) and 0.8 percent of 2,6 di (4 azidobenzal) methylcyclohexanon as a sensitizer, Kodak Thin Film Resist (KTFR), in xylene after degreasing with isopropanol vapor on a coherent memory plate of 128 "three-hole" store elements and one switching element formed by means of photoetching in a permalloy sheet (in percent by weight Ni, 80, Mo5, Fe 15) 20 (FIG. 3) of 10 μm. thick. The said solution was prepared by diluting 1 part by weight of KTFR with 4 parts by weight of xylene. Before the solution thus obtained was used, the impurities which were present in the form of solid substances were largely removed by passing the solution over a suitable millipore filter having a pore size of 1 μm.

A spray gun having a nozzle of 0.8 mm. diameter was used for spraying the diluted KTFR solution. The pressure during spraying was maintained at 0.7 kg./sq.cm. Both sides of the permalloy sheet were thus sprayed with 20 crossed layers of the KTFR solution at a distance of 30 cm. between the spray gun and permalloy under dust-free conditions. Subsequently the KTFR layer provided was dried for 15 minutes at room temperature and then hardened with the aid of ultraviolet light. A high-pressure mercury lamp of 125 w. (type HPR) was used for hardening by which lamp the said KTFR layer was exposed for 45 minutes at a distance of 30 cms. It was found after hardening that the permalloy sheet was provided throughout with a pore-free insulation layer having a thickness of approximately 30 μm. while in addition the channels between two successive three-hole elements and denoted by the reference numeral 19 in FIG. 2 has been bridged completely by the hardened photoresist layer.

Figure 5:
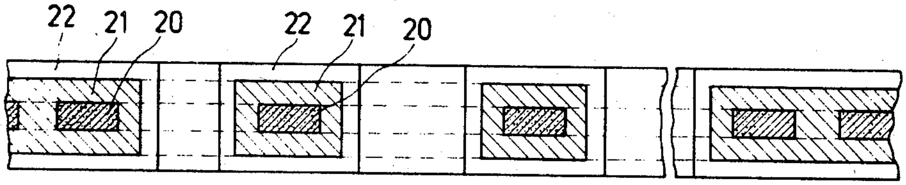

The permalloy sheet was subsequently provided with a 10 μm. thick adhesive layer 22 (FIG. 5) on either side by spraying 15 crossed layers of a diluted solution of a party thermoplastic, partly thermosetting adhesive of the Hycartype which is marketed by Shipley Company under the name 200 TF, 2 parts by weight of a butadiene acrylonitrile copolymer, in a molar ratio of 2 butadiene 1, 3 and 1 acrylonitrile, and 1 part by weight of a cresolformaldehyde-resol having a molar ratio of 1 cresol to 1, 4 formaldehyde. The said adhesive solution was prepared by diluting 1 part by weight of 200 TF with 2 parts by weight of cyclohexanone and 3 parts by weight of methylisobutyl ketone. The spraying circumstances were the same as those for the insulating KTFR layer with the difference that the spraying pressure upon providing the adhesive layer was 0.6 kg./sq.cm. Subsequently the adhesive layer was partially hardened by heating at 70° C. for 30 minutes.

To ensure a satisfactory adhesion between the metal pattern and the adhesive layer, the adhesive layer was superficially roughened chemically by treating it for 1 minute at room temperature with a 6 molar $HNO_3$ solution. After the residues of the roughening bath left on the surface had been removed by means of thorough rinsing for 2 minutes in running deionized water, the permalloy sheet was provided with a uniform catalytically acting layer consisting of nuclei by maintaining it immersed for 2 minutes in a bath containing 10 grams of $SnCl_2$ and 20 ml. of concentrated HCl per liter of water, succeeded by rinsing for 1 minute in cold running deionized water, maintaining it immersed for 1 minute in an aqueous solution of 2 mol $AgNO_3$ per liter, succeeded by rinsing for 30 seconds in cold running deionized water and finally maintaining it again for 1 minute in an activating bath containing 0.2 gram of $PdCl_2$ and 2 ml. of concentrated HCl per liter of water.

Figure 6:
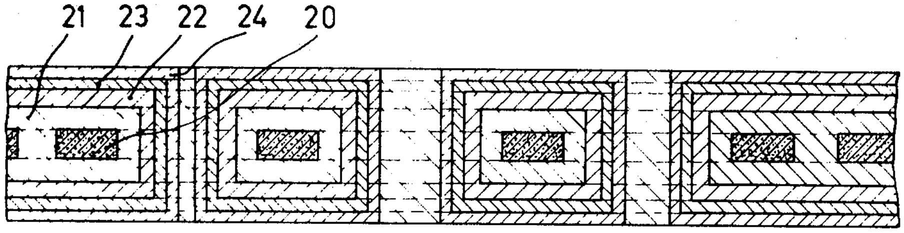

After rinsing for 30 seconds in running deionized water, the catalytic layer of nuclei obtained was uniformly intensified to an electrically conducting copper layer 23 (FIG. 6) of approximately 0.5 μm. thickness by treating it for 4 minutes at room temperature with a chemical copper-plating solution containing per liter of water:

0.028 mol copper sulfate ($CuSO_4 \cdot 5H_2O$)

0.03 mol tetra-Na-salt of ethylenediamine tetraacetic acid 0.1 mol NaOH and 40 ml. of formaldehyde solution (35 percent)

After rinsing with deionized water the electrically conducting copper layer obtained was intensified by electroplating at a temperature of 40° C. and a current density of 4 amps/sq.dm. up to approximately 10 $\mu$m. thick with copper 24 (FIG. 6) in a bath containing 0.75 mol $CuSO_4 \cdot 5H_2O$ and 0.40 mol. $H_2SO_4$ per liter of water. Subsequently rinsing with water took place again whereafter the surface of the electroplated copper layer was subjected to a light etching treatment by maintaining the permalloy sheet immersed for 10 seconds in an aqueous solution of 1.25 molar $H_2SO_4$.

After thorough rinsing in deionized water and drying the electroplated copper layer was subsequently provided throughout with a positive etching resist 25 (FIG. 7) of approximately 2 $\mu$m. thick by spraying four crossed layers of the positive photoresist marketed by Shipley Company under the name AZ–1,350 and consisting of a solution of 15.4 by weight of cresolformaldehyde-resin and 4.6 percent of naphthoquinone diazide as a sensitizer in a solvent consisting of 9 percent by weight of n-butylacetate 10 percent by weight of technical xylene 81 percent by weight of ethylglycol acetate.

Prior to its use said photoresist was largely purified from impurities in the form of solid substances by passing it over a suitable filter having a pore size of 0.8 $\mu$m. The spraying circumstances were the same as those for the insulation layer with the difference that a nozzle of 0.5 mm. diameter was used while the spraying pressure was 1.1 kg./cm. when the layer was provided.

Figure 7:
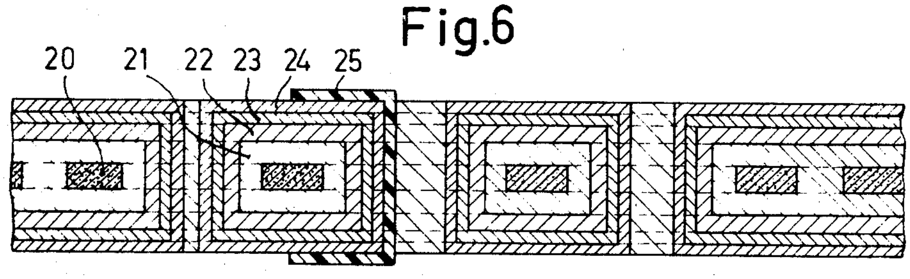

After 30 minutes of drying at 70° C. the photoresist was subsequently exposed behind the negative of the desired printed pattern on both sides in the holes and around the edges for 5 minutes at a distance of 30 cm. by means of 2 HPR lamps which had been placed on either side of the permalloy sheet, whereafter the photoresist was removed on the exposed areas by maintaining the permalloy sheet immersed in accordance with the instructions successively for 3×30 seconds in three solutions each containing 1 volume part AZ—developer (Shipley) and 1 volume part of water. The result was the situation as shown in FIG. 7.

Figure 8:
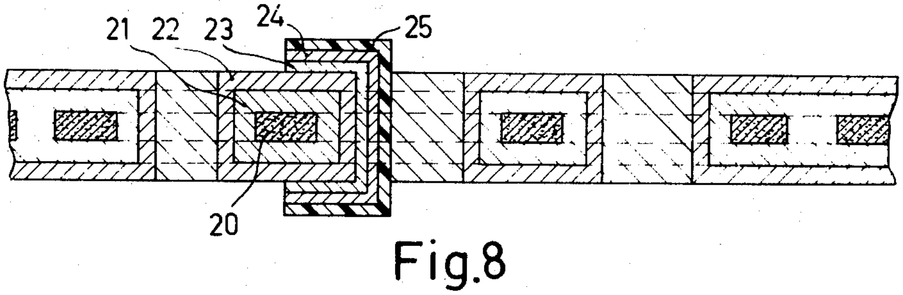

Subsequently rinsing in deionized water and drying took place whereafter the copper on the areas where the resist had been removed was etched away in a spray-etching machine containing a solution of $FeCl_3$ having a specific weight of 1.28 (see the situation obtained, shown in FIG. 8). The etching period of each side of the permalloy sheet was 45 seconds while the temperature of the etching liquid was 25° C.

Figure 9:
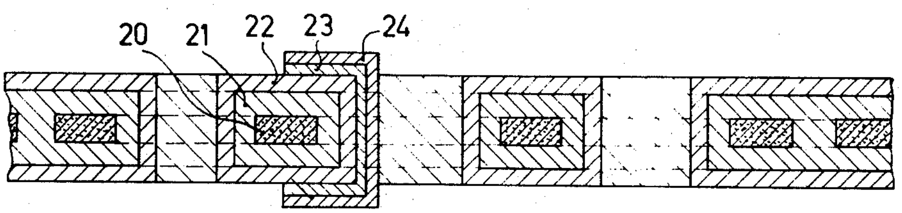

Finally, rinsing took place in deionized water whereafter optionally the photoresist still present on the copper patterns was removed by treating them for 30 seconds at room temperature with ethanol. (See the situation shown in FIG. 9.)

According to the method described in this example an uninterrupted printed wiring pattern was obtained which was isolated free from pores from the permalloy sheet and had a satisfactory adhesion while the magnetic properties of the permalloy were not inadmissible influenced by the layers provided.

Corresponding results may be obtained by using, instead of the diluted 200 TF adhesive, a diluted polyester adhesive solution which was obtained by diluting 8 parts by weight of a 15 percent by weight solution of polyester resin 49002 of the firm Du Pont de Nemours. The polyester resin 49002 of Du Pont de Nemours is prepared from terephthalic acid and propylene glycol, in chloroform to which 1 part by weight of diphenylmethanediisocyanate hardener RC–805 (Du Pont de Nemours), was added in 40 parts by weight of adhesive solution, with 30 parts by weight of dichloroethane, 5 parts by weight of ethylacetate and 5 parts by weight of cyclohexanone.

It is alternatively possible to obtain satisfactory results when subsequent to providing the thin electrically conducting copper layer 4 the entire permalloy sheet is provided with a few microns thick positive photoresist which is resistant to electroplating such as, for example, AZ–1350 Photoresist of Shipley Company, by subsequently exposing the photoresist in accordance with the desired wiring pattern and by removing the exposed photoresist by means of development, by subsequently copper-plating to the desired thickness on those areas where the photoresist has been removed and by finally removing the thin copper layer by means of etching after the photoresist which is still present has been removed.

Qualitatively comparable results are obtained when the photoresist used is replaced by using a solution of the photoresist KPR (Eastman Kodak) a polyvinylcinnamate obtained by esterification of polyvinylalcohol and cinnamic acid diluted with xylene in a ratio of 1:1.

EXAMPLE 2

A coherent memory plate of 128 "three-hole" store elements and one switching element formed by means of photoetching in a permalloy sheet of 10 $\mu$m. thick was provided with a KTFR layer of approximately 30 $\mu$m. thick in the manner as described in example 1 after degreasing with isopropanol vapor.

After hardening the KTFR layer with the aid of ultraviolet light both sides of the permalloy sheet were provided with a photosensitive adhesive layer of approximately 10 $\mu$m. thick by spraying 20 crossed layers of a homogeneous dispersion of $TiO_2$ in a solution of a thermosetting and a flexible adherent resin. Said homogeneous dispersion was obtained by distributing solid finely dispersed particles of $TiO_2$ in a ratio of 2 parts by weight of photosensitive substance and 25 parts by weight of adhesive solution through an adhesive solution which was prepared by mixing 1 part by weight of a 20 percent by weight solution of 1 part by weight of an epoxy resin and 1 part by weight of a butadiene acrylonitrile copolymer in methylethyl ketone with 3 parts by weight of methylisobutyl ketone and 1 part by weight of cyclohexanone. The spraying circumstances were the same as those described in example 1 for the insulating KTFR layer with the difference that the spraying pressure was 0.8 kg./sq.cm. when the photosensitive adhesive layer was provided.

After partial hardening by means of heating for 30 minutes at 70° C. the permalloy sheet was maintained immersed for 1 minute in a bath containing 0.5 grams of $PdCl_2$ and 5 ml. of concentrated HCl per liter of water.

After drying in hot air, the photosensitive adhesive layer was subsequently exposed on both sides, in the holes and around the edges behind the negative of the desired wiring pattern for 30 seconds at a distance of 40 cm. by means of two HPR lamps which had been placed on either side of the permalloy sheet.

The conversion of the light reaction product produced during exposure into a latent image consisting of Pd-nuclei was completed and the palladium salt retained by the layer on the areas not exposed was removed by rinsing for 15 seconds in deionized water. The latent image formed was subsequently intensified to an electrically conducting copper pattern by treating it for 6 minutes at 35° C. with a chemical copper-plating solution in water containing per liter:

0.14 mol copper sulfate ($CuSO_4 \cdot 5H_2O$)

0.40 mol triethanolamine 0.65 mol NaOH and 160 ml. of formaldehyde solution (35 percent)

After rinsing in deionized water the electrically conducting metal pattern obtained was finally intensified to the desired thickness by means of electroplating with the aid of the bath mentioned in example 1.

What is claimed is:

1. A method comprising applying a coating of photoresist to a coherent memory plate, having store and switching elements which are formed from a set of metallic magnetic material having a right-angle hysteresis loop; exposing the photoresist to light to harden the photoresist and form a substantially pore-free insulation layer; coating the hardened photoresist with a layer of adhesive, which can be hardened at a temperature less than 130° C. and the solvent of which does not substantially attack the hardened photoresist; hardening the adhesive layer and depositing a metal layer on said adhesive which metal layer forms the base for a printed circuit.

2. The method of claim 1 wherein the resist and the adhesive are provided by means of spraying.

3. The method of claim 1 wherein the adhesive layer is subjected to a mild chemical roughening treatment prior to deposition of the metal layer.

* * * * *